(12) United States Patent
Yamaya

(10) Patent No.: US 11,249,448 B2
(45) Date of Patent: Feb. 15, 2022

(54) DEVICES, CONTROL MODULES, AND CONTROLLERS

(71) Applicant: RENESAS ELECTRONICS CORPORATION, Tokyo (JP)

(72) Inventor: Jun Yamaya, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 246 days.

(21) Appl. No.: 16/540,818

(22) Filed: Aug. 14, 2019

(65) Prior Publication Data
US 2020/0073349 A1  Mar. 5, 2020

(30) Foreign Application Priority Data

Sep. 5, 2018 (JP) .............................. JP2018-165774

(51) Int. Cl.
*H02J 7/00* (2006.01)
*G05B 19/042* (2006.01)
*H04B 3/04* (2006.01)
*H04B 3/54* (2006.01)

(52) U.S. Cl.
CPC .............. *G05B 19/042* (2013.01); *H02J 7/00* (2013.01); *G05B 2219/25112* (2013.01); *G05B 2219/25369* (2013.01)

(58) Field of Classification Search
CPC ........ G05B 19/042; G05B 2219/25369; G05B 2219/25112; G05B 2219/2639; H02J 7/00; H02J 7/007; H02J 7/0045; H02J 7/342; H02J 2207/30; H04B 3/54; H04B 3/04
USPC ......................................... 713/300, 320, 330
See application file for complete search history.

(56) References Cited

U.S. PATENT DOCUMENTS

2015/0362939 A1* 12/2015 Takijiri ................ G05D 7/0641
 700/297
2016/0266214 A1* 9/2016 Nomura ............. G01R 33/0023

FOREIGN PATENT DOCUMENTS

JP  05-061571 A  3/1993
JP  09-091062 A  4/1997

* cited by examiner

*Primary Examiner* — Michael J Brown
(74) *Attorney, Agent, or Firm* — McDermott Will & Emery LLP

(57) ABSTRACT

The present invention provides a configuration capable of further suppressing power required for monitoring connection between devices. The device includes a controller capable of selecting an active state and a low power consumption state, and a switch device for controlling electrical connection/disconnection between an interrupt signal line and a bus in accordance with an output signal from the controller. In the low power consumption state, the controller returns to the active state when the potential appearing on the interrupt signal wiring substantially matches the potential of the bus, and after the return to the active state, provides the output signal to the switch device to electrically connect the interrupt signal wiring and the bus.

11 Claims, 12 Drawing Sheets

DEVICES, CONTROL MODULES, AND CONTROLLERS

CROSS-REFERENCE TO RELATED APPLICATIONS

The disclosure of Japanese Patent Application No. 2018-165774 filed on Sep. 5, 2018 including the specification, drawings and abstract is incorporated herein by reference in its entirety.

BACKGROUND

The present disclosure relates to a device capable of communicating with another device and transmitting/receiving power, a control module constituting the device, and a controller constituting the control module.

Conventionally, a configuration capable of exchanging electric power via a cable including a communication line has been known. For example, in the USB (Universal Serial Bus) standard, communication between devices is possible via USB cables, and power can be supplied from one device to the other.

When such power supply is started, it is necessary to detect connection between devices. Therefore, it is preferable to be able to detect the connection with the opposing device before the power supply.

As a technique for monitoring the connection, for example, Japanese Unexamined Patent Application Publication No. 09-091062 (Patent Document 1) discloses a connection recognition method in which the mode switching can be automatically performed by recognizing the connection between terminals for each terminal without increasing the number of connection terminals or the software load.

In the connection recognition method disclosed in Patent Document 1, there is a problem that it is necessary to monitor a change in an input potential, and power is consumed even during monitoring of a connection. In order to cope with such a problem, for example, Japanese Unexamined Patent Application Publication No. 2005-061571 (Patent Document 2) discloses a configuration in which power consumption is reduced by pulling up for a predetermined period of time rather than for the entire period of time.

SUMMARY

In the configuration disclosed in the above-mentioned Patent Document 2, power necessary for pull-up is consumed even if power consumption can be reduced. Therefore, there is a demand for a configuration that can further suppress the power required for monitoring the connection between devices.

Other objects and novel features will become apparent from descriptions of this specification and accompanying drawings.

A device according to an embodiment includes a controller capable of selecting an active state and a low power consumption state, and a receptacle for receiving a cable including at least first and second power lines for electrically connecting with other devices. In the receptacle, a plurality of branch lines are formed by branching the first power line included in the cable. The device further includes a bus electrically connected to a part of the plurality of branch lines, an interrupt signal line electrically connecting a first branch line included in the remainder part of the plurality of branch lines to an interrupt input terminal of the controller, and a switching device controlling electrical connection/disconnection between the interrupt signal line and the bus in accordance with an output signal from the controller. In the low power consumption state, the controller returns to the active state when the potential appearing on an interrupt signal wiring substantially matches the potential of the bus, and after the return to the active state, provides the output signal to the switch device to electrically connect the interrupt signal wiring and the bus.

According to some embodiments, the power required for monitoring the connection between devices can be further reduced.

DETAILED DESCRIPTION

Figure 1A:
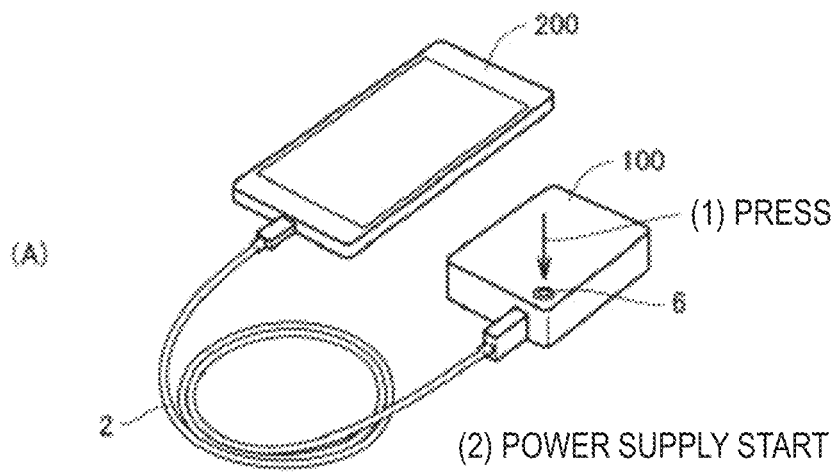
FIGS. 1A and 1B are schematic diagrams showing an example of application of the present embodiment.

Several embodiment will be described in detail below with reference to the drawings. In the following drawings, the same or corresponding parts are denoted by the same reference numerals, and the description thereof will not be repeated.

The present technique is applicable to the process of monitoring and detecting connections between arbitrary devices. In the following descriptions, embodiments are exemplified with respect to monitoring and detecting connections between devices via cables that typically conform to the USB Type-C standard (hereinafter also referred to as "USB cables"). However, the present technique is not limited to the monitoring and detection of the connection according to the USB Type-C standard, and is applicable to the treatment of monitoring and detecting the connection according to another USB standard, and is also applicable to the processing of monitoring and detecting the connection between any devices.

In the following description, for convenience of description, an example in which the device is mounted on a power supply side (power supply device: Source) is mainly described, but it is needless to say that the device can be mounted on a power receiving side (power supply device: Sink).

A typical background art will be described first.

Figure 1B:
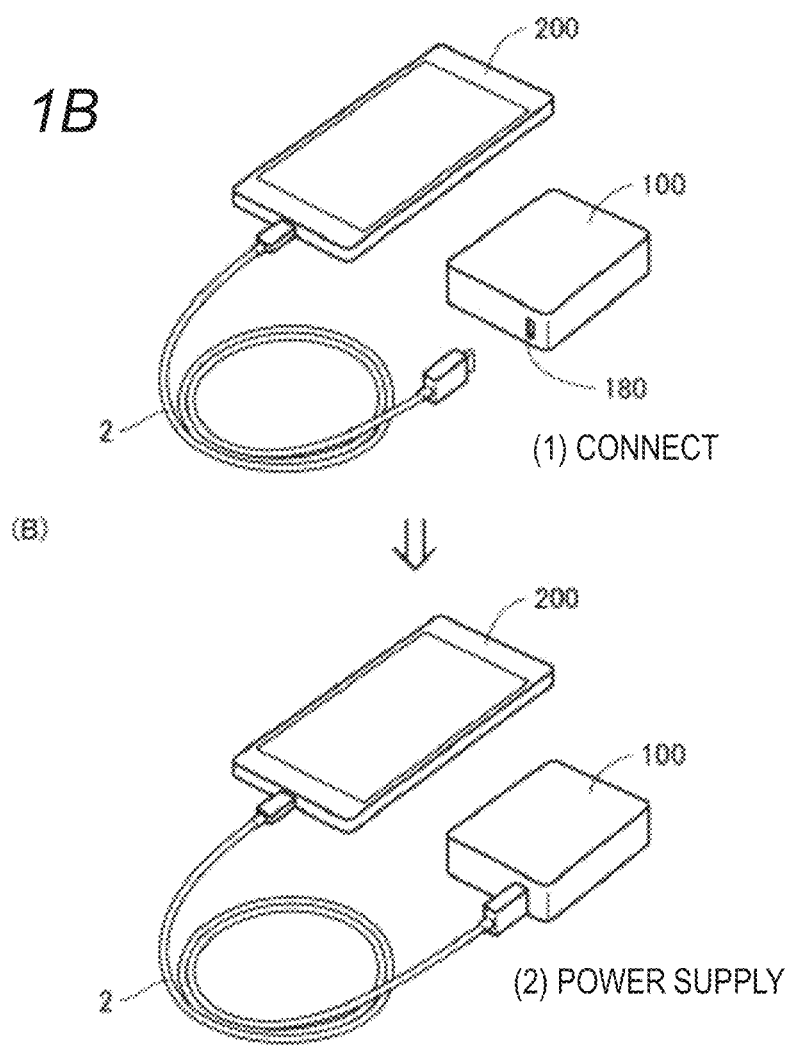

FIGS. 1A and 1B are schematic diagrams showing an application example of the present embodiment. FIGS. 1A and 1B show examples of supplying power from a power supply device 100 to a power receiving device 200. As the power supply device 100, a mobile battery, a laptop PC equipped with a large-capacity battery, or the like is assumed. As the power receiving device 200, a portable information terminal such as a smartphone or tablet is assumed. The laptop PC or the like may function as the power supply device 100 or the power receiving device 200. In this manner, the rolls may be interchangeable between the power supply device 100 and the power receiving device 200.

For example, according to the USB Type-C standard, one of the devices detects connection/disconnection with the opposite device using CC (Configuration Chanel) signals. Detecting connection/disconnection is performed by a controller that executes control according to the USB Type-C standard. Therefore, it is necessary for the controller to constantly monitor the voltage appearing in the CC signal. That is, power is required to constantly monitor the voltage appearing in the CC signal.

Therefore, it is required to reduce the power consumption by stopping a circuit function according to the state of the device. More specifically, when a predetermined condition (e.g., a predetermined period elapsed after the opposite device is detected to be in the disconnected state) is satisfied, the controller which controls the ports in accordance with the USB Type-C standards shifts to the low-power-consumption state. On the other hand, when an interrupt signal is generated by some method, in response to the interrupt signal, the controller is restored (i.e., the operation of the controller is resumed) and a process of detecting connection with the opposite device is executed.

In this specification, "low power consumption state" is a term used in contrast to "active state". The "active state" means a normal operation state of the controller, and the controller can execute arbitrary treatment without any limitation. "Low power consumption state" basically means a state in which treatment is stopped or degenerated except for a circuit for detecting an input of the interrupt signal. The "low power consumption state" may be referred to as a standby state or a sleep state.

As described above, when the controller is stopped to realize low power consumption, a mechanism for shifting the controller to the low power consumption state and a mechanism for restoring the controller from the low power consumption state are necessary. As a mechanism for shifting the controller to the low power consumption state, a method can be employed in which the controller itself shifts to the low power consumption state when the predetermined condition such as a state in which the controller is not connected to any device continues for the predetermined period of time is satisfied. On the other hand, as a mechanism for returning the controller from the low power consumption state, a method of providing the interrupt signal to the controller can be employed.

As a method of generating the interrupt signal, for example, a method by a user action such as depression of a physical switch by a user and physical connection of a plug to a receptacle is assumed.

FIG. 1A shows an example in which a physical switch 6 for generating the interrupt signal for starting power supply to the power supply device 100 is provided. In the configuration shown in FIG. 1A, the user connects the power supply device 100 and the power receiving device 200 via a USB cable 2, and then presses the physical switch 6. Then, the power supply device 100 detects the connection with the power receiving device 200, and the power supply from the power supply device 100 to the power receiving device 200 is started.

FIG. 1B shows an example in which the connection processing is started by connecting the power supply device 100 and the power receiving device 200 via the USB cable 2. In the configuration shown in FIG. 1B, when the user connects the power supply device 100 and the power receiving device 200 via the USB cable 2, the power supply device 100 detects connection with the power receiving device 200, and power supply from the power supply device 100 to the power receiving device 200 is started.

In a configuration shown in FIG. 1A, it is necessary to provide the physical switch 6, and it is necessary to explicitly operate the user. On the other hand, a configuration shown in FIG. 1B is advantageous in terms of cost and user operability because the power receiving and supplying operation is started only by inserting the plug of the USB cable 2 into a receptacle 180 of the power supplying device 100.

In the present embodiment, a configuration is provided in which the power consumption of the controller is reduced as necessary, and a power receiving operation as shown in FIG. 1B can be realized.

First Embodiment (1. Circuit Configuration)

Figure 2:
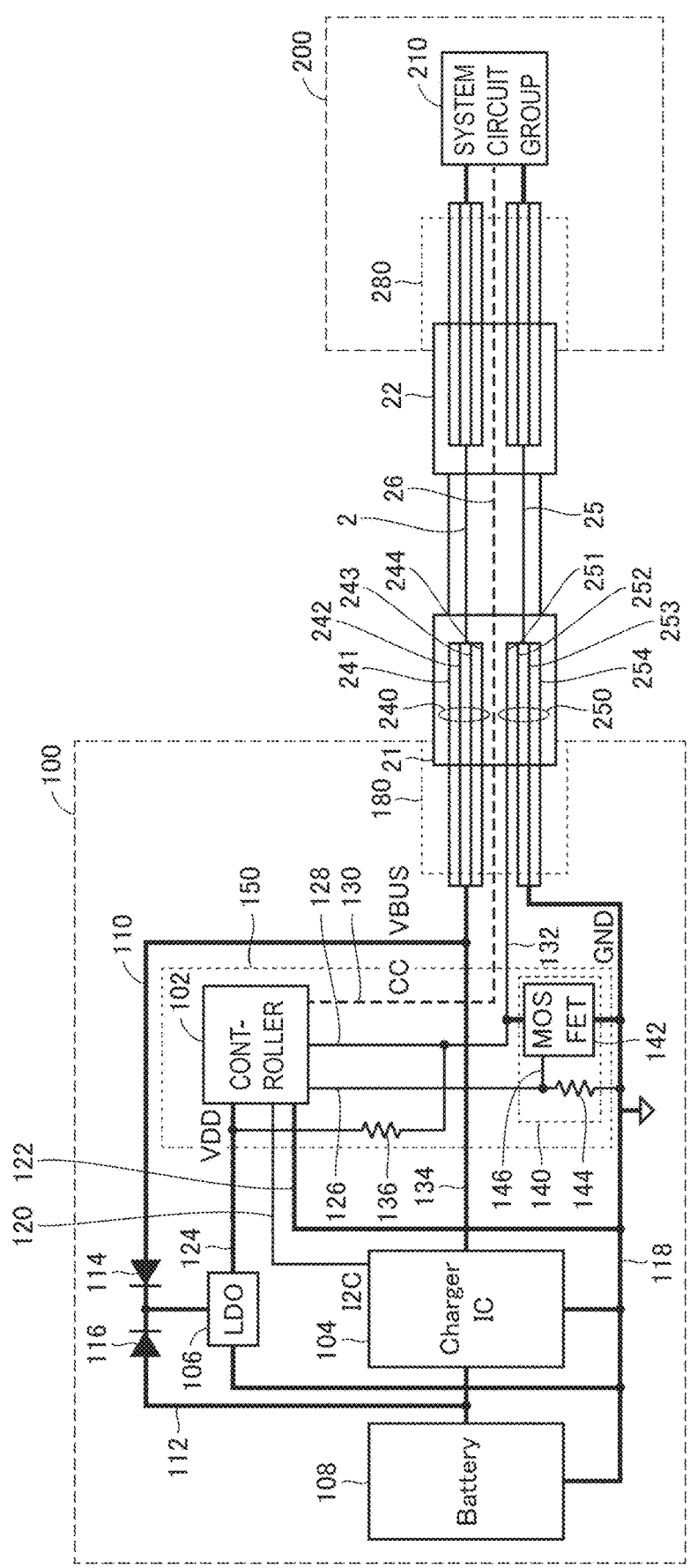
FIG. 2 is a schematic diagram showing a configuration example of a system according to a first embodiment.

Next, a configuration according to the first embodiment will be described. FIG. 2 is a schematic diagram showing a configuration example of a system according to the first embodiment.

Referring to FIG. 2, the power supply device 100 supplies power to the power receiving device 200 via a VBUS line 24 and a ground line 25 included in the USB cable 2.

The power supply device 100 includes, as main components, a control module 150, a charge control circuit (Charger IC) 104, a voltage regulator (LDO) 106, and a battery 108. The control module 150 is a circuit in charge of control in the power supply device 100, and includes a controller 102 and a switching circuit 140. As described above, the controller 102 can select the active state and the low power consumption state.

The power supply device 100 includes the receptacle 180 for receiving a cable for electrical connection with the opposing device. In the first embodiment, the receptacles 180 conforming to the USB Type-C standard are employed.

The power receiving device 200 includes a system circuit group 210 that uses power supplied from the power supply device 100. The power receiving device 200 also has a receptacle 280 that conform to the USB Type-C standard.

Plugs 21 and 22 conforming to the USB Type-C standard are provided at both ends of the USB cable 2. The receptacle 180 receives the plug 21 connected to the USB cable 2, and the receptacle 280 receives the plug 22 connected to the USB cable 2.

The USB cable 2, which is a cable according to the USB Type-C standard, includes a VBUS line 24, a GND line 25, and a communication line 26. The VBUS line 24 and the ground line 25 are conductors used for exchanging power, and correspond to the first and second power lines. The USB cable 2 further includes the communication line 26.

Between the receptacle 180 and the plug 21, and between the receptacle 280 and the plug 22 are electrically connected to each other respectively by a plurality of pins which mechanically contact with each other. Typically, in the USB Type-C standard, four pins are assigned for each of the VBUS line 24 and the ground line 25. Therefore, in each of the plug 21 and the plug 22 of the USB cable 2, the VBUS line 24 is branched into four pins (VBUS pins) and connected in parallel, and the GND line 25 is branched into four pins (GND pins) and connected in parallel.

Focusing on the receptacle 180 and the plug 21 of the power supply devices 100, one end of the VBUS line 24 is branched into a group of VBUS branch lines 240 consisting of four VBUS branch lines 241, 242, 243, 244. Similarly, one end of the GND line 25 is branched to a GND branch line group 250 consisting of four GND branch lines 251, 252, 253, and 254. As described above, the receptacle 180 are formed with a plurality of branch lines that branch the power lines included in the USB cable 2, i.e., the VBUS line 24 and the GND line 25.

As described later, in the present embodiment, one GND branch line included in a GND branch line group 250 is used for generating the interrupt signal for returning the controller 102 from the low power consumption state. Therefore, a part of the GND branch line group 250 (the plurality of GND branch lines 252, 253, and 254) are electrically connected to a GND bus 118, while the GND branch line 251 is electrically connected to the interrupt input terminal of the controller 102 via an interrupt signal line 128.

One end of the battery 108 of the power supply device 100 is electrically connected to the VBUS line 24 included in the USB cable 2 via the charge control circuit 104 and a power line 134. The other end (negative side) of the battery 108 of the power supply device 100 is electrically connected to the GND line 25 included in the USB cable 2 via the GND bus 118.

The charge controller 104 is disposed between the battery 108 and the VBUS line 24 of the USB cable 2. More specifically, the charge control circuit 104 controls a discharging operation from the battery 108 and a charging operation of the battery 108 in accordance with a control signal exchanged with the controller 102 via the control signal line 120. FIG. 2 shows an example in which power is supplied from the power supply device 100 to the power supply device 200, but it is also necessary to charge the power supply device 100 itself. Therefore, instead of the power receiving device 200, an external power source such as a power adapter may be connected.

The control signals may be exchanged between the controller 102 and the charging control circuit 104 in accordance with the I2C interface. In the discharging operation from the battery 108, the charge control circuit 104 converts the electric power discharged from the battery 108 into a predetermined voltage and outputs it via a electric power wiring 134. On the other hand, in the charging operation of the battery 108, the charging control circuit 104 converts the electric power supplied from the outside via the electric power wiring 134 into a predetermined voltage and supplies the voltage to the battery 108.

The controller 102 controls processing in the power supply device 100. Power for operating the controller 102 can be supplied from the battery 108 and the external power source, i.e., devices connected via the VBUS line 24.

Specifically, the output of a voltage regulator 106 is electrically connected to a positive power input terminal of the controller 102 via a power wiring 124, and a negative power input terminal of the controller 102 is electrically connected to the GND bus 118 via the GND wiring 122. The voltage regulator 106 is electrically connected to one end of the battery 108 via a power wiring 112, and is electrically connected to the VBUS line 24 via a power wiring 110. A diode 116 for preventing backflow is interposed in the power wiring 112, and a diode 114 for preventing backflow is interposed in the power wiring 110.

The controller 102 exchanges signals with the opposite device via the communication line 26 in the USB cable 2. The controller 102 is electrically connected to the communication line 26 in the USB cable 2 via a communication wiring 130.

The power supply device 100 includes the switching circuit 140 that generates the interrupt signal to return the controller 102 from the low power consumption state. The switching circuit 140 generates the interrupt signal in the event that the plug 21 of the USB cable 2 is inserted into the receptacle 180.

The interrupt signal line 128 is electrically connected to the power line 124 via a pull-up resistor 136. Therefore, in a state where the plug 21 of the USB cable 2 is not connected to the receptacle 180 of the power supply device 100, the power supply potential (VDD) (i.e., the Hi potential) appearing in the power wiring 124 is supplied to the interrupt input terminal of the controller 102.

On the other hand, when the plug 21 of the USB cable 2 is connected to the receptacle 180 of the power supply device 100, the interrupt signal line 128 is electrically connected to the GND line 25. As a result, a circuit from the power wiring 124 to the GND line 25 is formed via the pull-up resistor 136, a GND wiring 132, and the GND branch line 251. In this state, a potential substantially the same as the potential (GND) of the GND bus 118 (i.e., a Low potential) appears in the interrupt signal wiring 128 by the pull-up resistor 136. Thus, the controller 102 detects the input of the interrupt signal. The interrupt signal allows the controller 102 to recover from the low power consumption state.

The power supply device 100 includes a switch device 142 connected to the interrupt input terminal of the controller 102 via the interrupt signal line 128. The switch device 142 controls electrical connection/disconnection between the interrupt signal wiring 128 and the GND bus 118 in accordance with an output signal from the controller 102.

As the switch device 142, typically, a solid-state switch device such as a MOSFET (metal-oxide-semiconductor field-effect transistor) may be used. The pull-up resistor 136 is connected between the power line 124 and the interrupt signal line 128. One end of the interrupt signal line 128 is electrically connectable to the GND line 25 included in the USB cable 2 via the GND line 132 and the GND branch line 251.

An output terminal of the controller 102 is connected to the GND bus 118 via an output signal wiring 126. The output signal line 126 is connected to the GND bus 118 via a pull-down resistor 144. A node of the output signal wiring 126 and a gate of the switch device 142, which are located between the output terminal of the controller 102 and the pull-down resistor 144, are electrically connected to each other via a gate wiring 146.

The switch device 142 becomes conductive when an activation signal is applied to the gate from the output terminal of the controller 102 via the output signal wiring 126 and the gate wiring 146. In a state in which the activation signal is not applied to the gate, it is assumed that the gate is in a non-conductive state. When the activation signal is applied to the gate of the switch device 142, a current path that flows from the GND bus 118 to the GND line 25 included in the USB cable 2 via the GND line 132 and the GND branch line 251 is formed. As a result, it is possible to prevent the current capacity from being limited in the power supply from the power supply device 100 to the power receiving device 200.

(2. Configuration of Controller 102)

Figure 3:
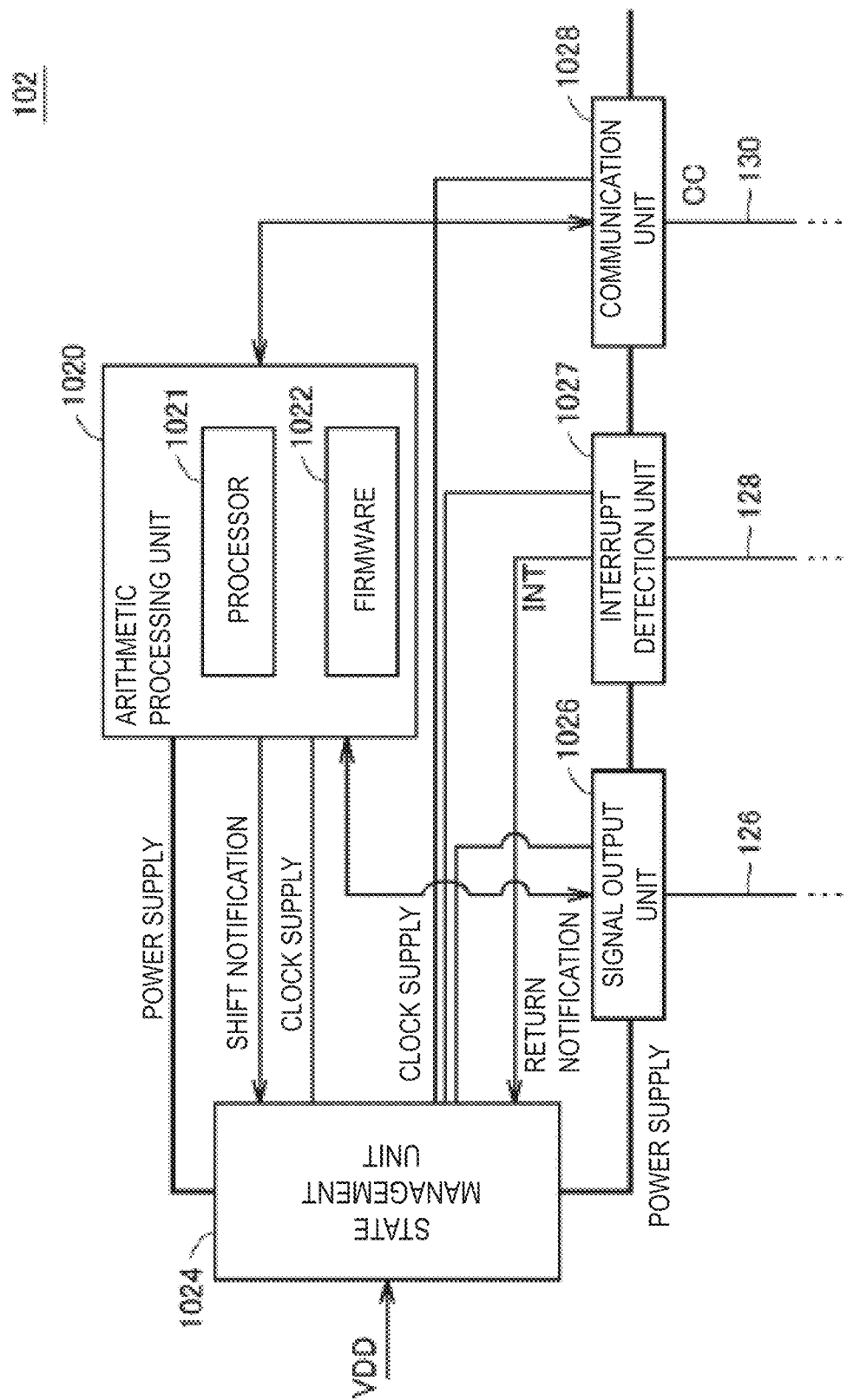
FIG. 3 is a schematic diagram showing a configuration example of a controller form a system according to the first embodiment.

Next, a configuration of controller 102 that configures a system according to the first embodiment will be described. FIG. 3 is a schematic diagram showing a configuration example of the controller 102 form the system according to the first embodiment.

Referring to FIG. 3, controller 102 includes, as main components, an arithmetic processing unit 1020, a state management unit 1024, a signal output unit 1026, an interrupt detection unit 1027, and a communication unit 1028.

The arithmetic processing unit 1020 performs overall processing in the controller 102. As an example, the arithmetic processing unit 1020 includes a processor 1021 and firmware 1022. The firmware 1022 is a type of control program, and the processor 1021 executes the firmware 1022 to realize various processes as described later.

The state management unit 1024 manages the active state and the low power consumption state in the controller 102. For example, the state management unit 1024 selects a circuit for supplying the power supply potential VDD or a circuit for supplying the operation clock according to the state.

Specifically, in the low power consumption state, the state management unit 1024 supplies the power supply potential to the interrupt detection unit 1027, and stops the supply of the other circuits. Alternatively, the state management unit 1024 supplies the operation clock only to the interrupt detection circuit 1027. By such an operation, the state management unit 1024 reduces the power consumption of the controller 102. Note that the method of reducing the power consumption of the controller 102 is not limited to the method of controlling the power supply or the operation clock provided, and an arbitrary implementation mode can be adopted.

The state management unit 1024 returns from the low power consumption state to the active state in response to a return notification from the interrupt detection unit 1027. As described above, when the interrupt detection unit 1027 detects the interrupt signal in the low power consumption state, the state management unit 1024 returns to the active state. The state management unit 1024 shifts from the active state to the low power consumption state in response to a shift notification from the arithmetic processing unit 1020.

The interrupt detection unit 1027 detects the interrupt signal supplied via the interrupt signal wiring 128. In the first embodiment, the input of the interrupt signal is detected on condition that a ground potential appears in the interrupt signal wiring 128. When the interrupt detection unit 1027 detects the interrupt signal, the return notification is given to the state management unit 1024.

The signal output unit 1026 outputs an output signal to the gate of the switch device 142 via the output signal wiring 126 in response to a command from the arithmetic processing unit 1020.

The communication unit 1028 exchanges signals with the opposite device via the communication wiring 130 and the communication line 26 in the USB cable 2.

As will be described later, in the first embodiment, the arithmetic processing unit 1020 outputs the output signal from the signal output unit 1026 after returning to the active state. Typically, after returning to the active state, the arithmetic processing unit 1020 outputs the output signal when it detects that it is in a connected state with the opposite device via the communication line 26 included in the USB cable 2.

In the controller 102 shown in FIG. 3, necessary processing and functions are realized by the processor 1021 executing the firmware 1022. The firmware 1022 executed by the processor 1021 may be installed or updated from the outside. For example, the firmware 1022 may be distributed while being stored in a non-temporary recording medium, and may be installed or updated in a storage area (not shown) of the arithmetic processor 1020. As the non-temporary recording medium, an optical recording medium such as an optical disk, a semi-conductor recording medium such as a flash memory, a magnetic recording medium such as a hard disk or a storage tape, or a magneto-optical recording medium such as an MO (Magneto-Optical disk) may be used. That is, the first embodiment may also include a computer-readable control program for realizing necessary processing and functions, and a recording medium storing the control program.

Alternatively, the firmware 1022 may be downloaded from a server device via an Internet or an intranet.

Alternatively, some or all of the processing and functions provided by the controller 102 may be implemented in hardware. For hardware-mounting, hard-wired devices such as ASIC (Application Specific Integrated Circuit) and FPGA (Field-Programmable Gate Array) may be employed.

Person skilled in the art will design a controller according to the present embodiment and a device including the controller using techniques according to an age in which the present embodiment is implemented, as appropriate.

(3. Circuit Operation)

Next, a circuit operation of the switching circuit 140 illustrated in FIG. 2 will be described with reference to FIGS. 4 to 6.

Figure 4:
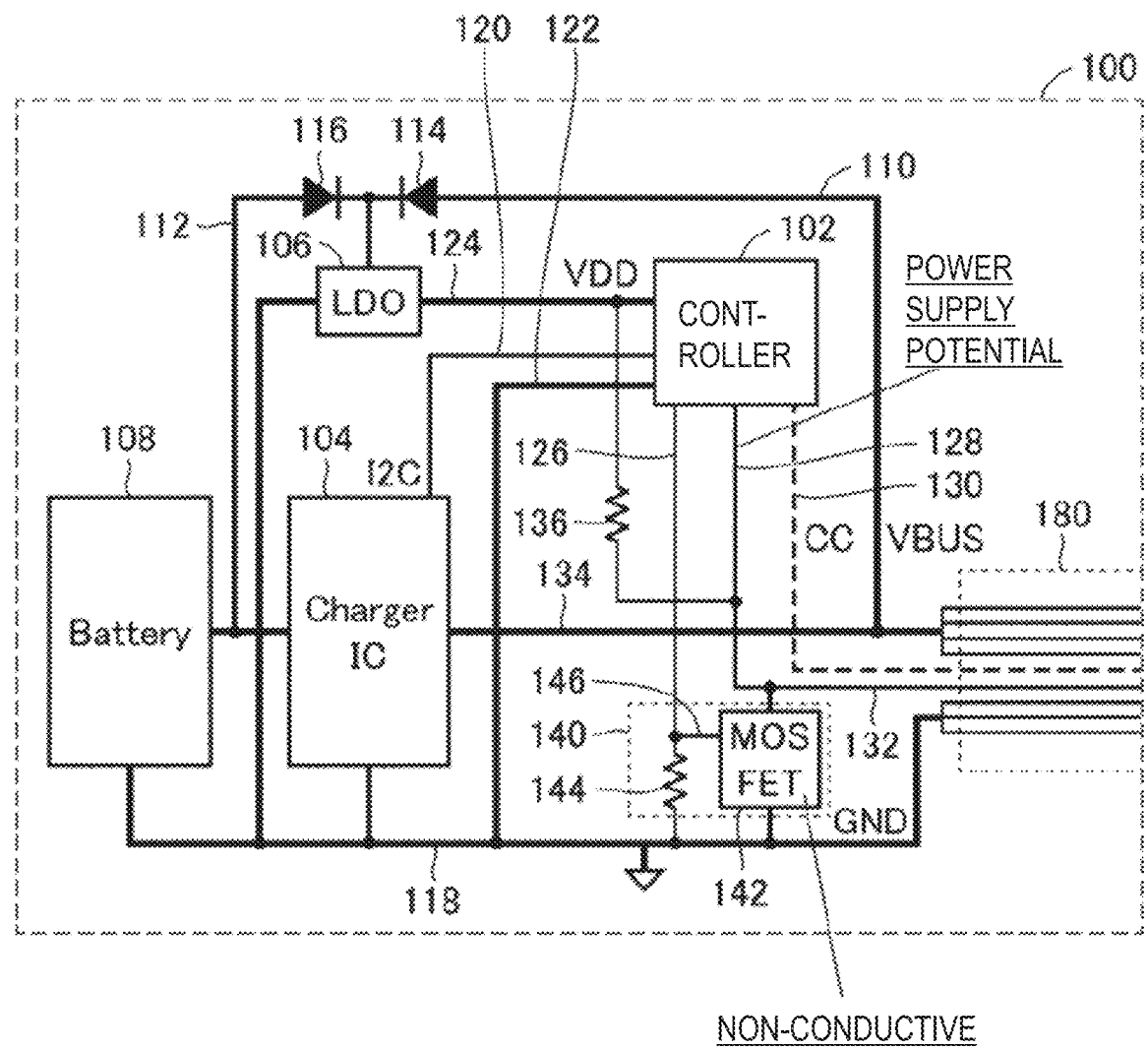
FIG. 4 is a schematic diagram showing a state in which a plug 21 of a USB cable is not connected to a receptacle of the power supply device according to the first embodiment.

FIG. 4 is a schematic diagram showing a state in which the plug 21 of the USB cable 2 is not connected to the receptacle 180 of the power supply device 100 according to the first embodiment. FIG. 5 is a schematic diagram showing a state immediately after the plug 21 of the USB cable 2 is connected to the receptacle 180 of the power supply device 100 according to the first embodiment. FIG. 6 is a schematic diagram showing a state after a predetermined time has elapsed after the plug 21 of the USB cable 2 is connected to the receptacle 180 of the power supply device 100 according to the first embodiment.

In the state shown in FIG. 4, the controller 102 is assumed to be in the low power consumption state. Referring to FIG. 4, in a state where the plug 21 of the USB cable 2 is not connected to the receptacle 180 of the power supply device 100, the power supply potential VDD appears in the interrupt signal line 128. Therefore, the interrupt signal to the controller 102 is in an invalid state, and the controller 102 maintains the low power consumption state. At this time, since the controller 102 is in the low power consumption state, the output signal wiring 126 is also in an inactive state, and the switch device 142 is in the non-conductive state.

Figure 5:
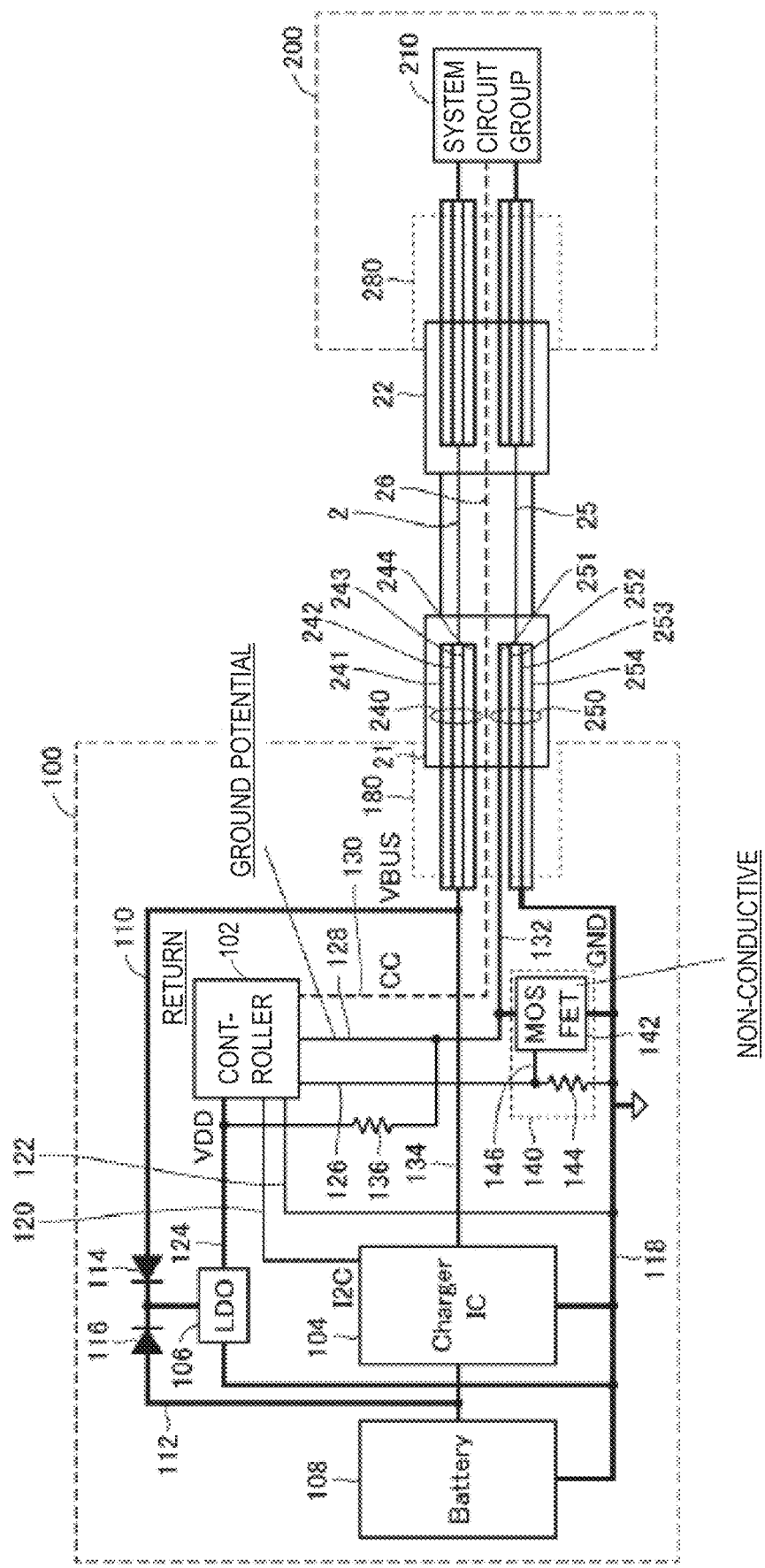
FIG. 5 is a schematic diagram showing a state immediately after a plug 21 of a USB cable is connected to a receptacle of the power supply device according to the first embodiment.
Figure 6:
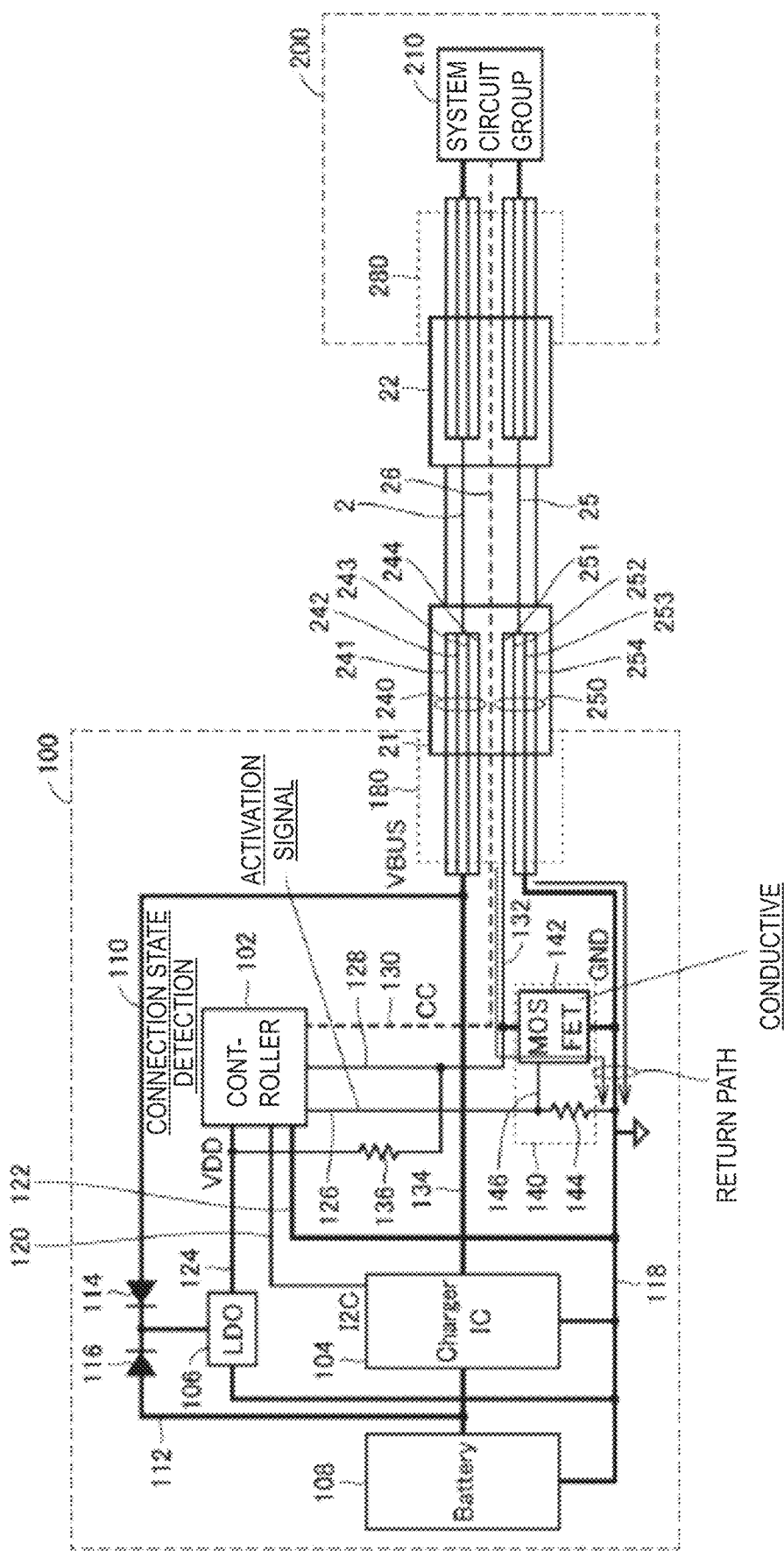
FIG. 6 is a schematic diagram showing a state after a predetermined time when a plug 21 of a USB cable is connected to a receptacle of a power supply device according to the first embodiment.

Thereafter, as shown in FIG. 5, when the plug 21 of the USB cable 2 is connected to the receptacle 180 of the power supply device 100, the interrupt signal line 128 is electrically connected to the GND line 25 included in the USB cable 2 via the GND line 132 and the GND branch line 251. As a result, the ground potential appears on the interrupt signal line 128. When the ground potential appears on the interrupt signal wiring 128, the interrupt signal to the controller 102 becomes a valid state, and the controller 102 returns from the low power consumption state to the active state. However, during the return operation of the controller 102, since the signal cannot be output from the controller 102, the output signal wiring 126 is also in the inactive state, and the switch device 142 is in the non-conductive state.

Thereafter, after returning to the active state, the controller 102 starts connection processing with the connection destination device. As shown in FIG. 6, when it is detected that the controller 102 is in the connection state with a connection destination device, a signal output from the controller 102 is validated, and the output signal wiring 126 is also in the active state. As a result, the switch device 142 transitions from the non-conductive state to the conductive state. Then, the current supply is started.

When the switch device 142 transitions to the conductive state, not only the three GND branch lines 252, 253, and 254 but also the GND branch line 251 used for generating the interrupt signal functions as a current path related to power supply from the power supply device 100 to the power receiving device 200. That is, in addition to the three GND branch lines 252, 253, and 254, the GND branch line 251 also functions as a current return path.

Figure 7:
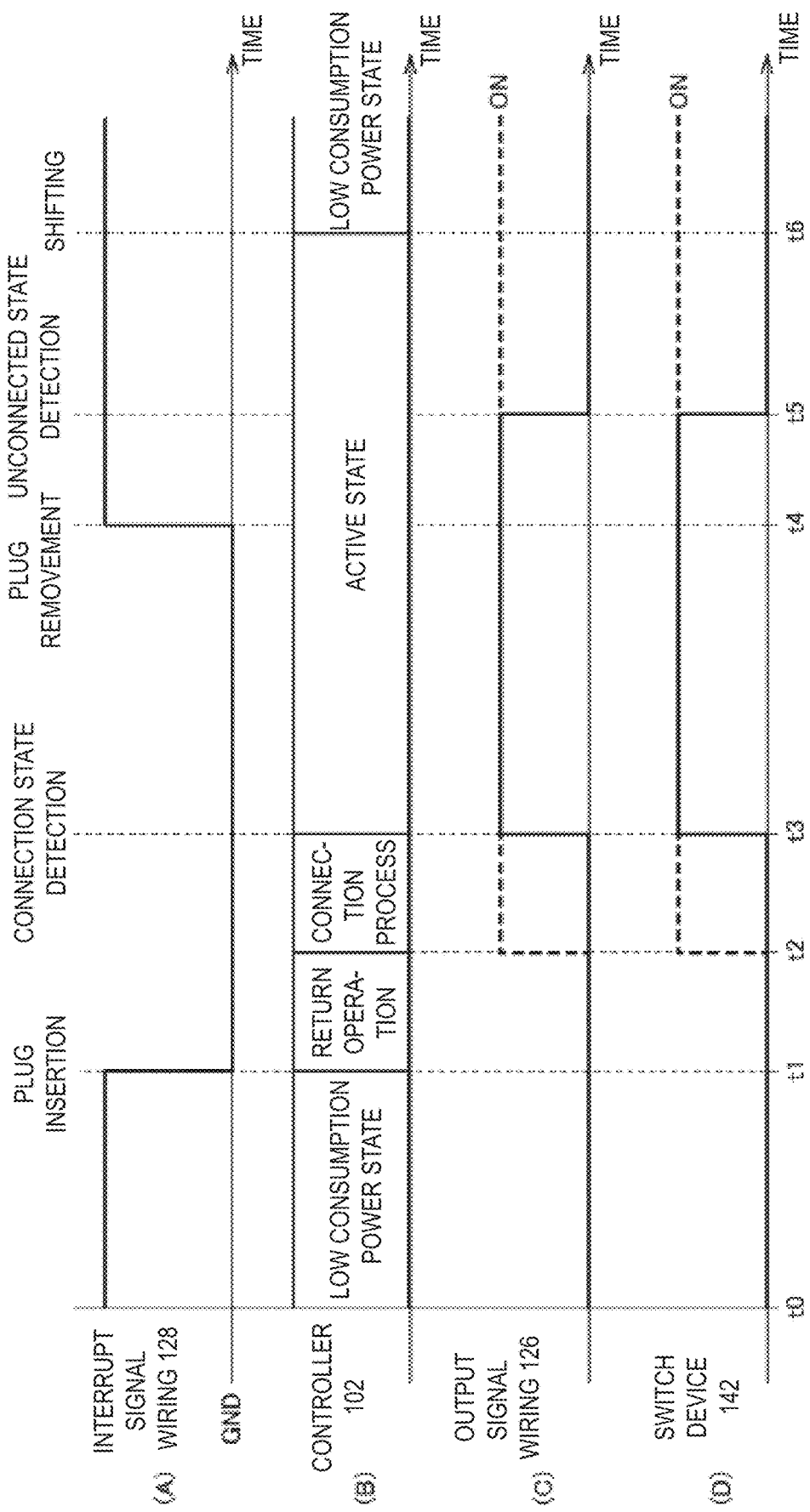
FIG. 7 is a time chart illustrating operation of a system according to the first embodiment.

Next, the circuit operation shown in FIGS. 4 to 6 will be described with reference to time charts. FIG. 7 is a time chart showing the operation of the system according to the first embodiment.

Referring to FIG. 7, assume that the controller 102 is in the low power consumption state at an initial state (time t0). It is assumed that the plug 21 of the USB cable 2 is inserted into the receptacle 180 at time t1. Then, the potential of the interrupt signal wiring 128 changes from the power supply potential (VDD) to the ground potential (GND). In response to this potential change, the controller 102 starts a return operation from the low power consumption state. At time t2, the return operation is completed, and the controller 102 returns to the active state.

Subsequently, the controller 102 starts connection processing with the connection destination device. At time t3, when the controller 102 detects the connected state, the output signal wiring 126 are changed to the active state and the switch device 142 transitions from the non-conductive state to the conductive state in conjunction with change of the output signal wire.

By the operation described above, the controller 102 can be returned from the low power consumption state to the active state in response to an event such as insertion of the plug 21 into the receptacle 180, and the current capacity can be prevented from being limited in power supply from the power supply device 100 to the power receiving device 200.

That is, when the potential appearing on the interrupt signal line 128 substantially matches the potential of the GND bus 118 in the low power consumption state, the controller 102 returns to the active state, and after the return to the active state, provides the output signal to the switch device 142 to electrically connect the interrupt signal line 128, the GND line 132, and the GND bus 118.

Typically, the controller 102 provides the output signal to the switch device 142 when it detects that it has become connected to the opposing device via the communication line 26 included in the USB cable 2 after returning to the active state.

Further, at time t4, when the plug 21 of the USB cable 2 is removed from the receptacle 180, the potential of the interrupt signal wiring 128 changes from the ground potential (GND) to the power supply potential (VDD). At a subsequent time t5, when the controller 102 determines that it is in an unconnected state, the output signal wiring 126 are changed to the inactive state in conjunction with which the switch device 142 transitions from the electrically conductive state to the unconnected state. By the transition of the switch device 142 to the non-conducting state, it enables the interrupt signal to be generated by inserting a plug of the USB cable 2 into the receptacle 180 of the device. Then, after the switch device 142 is brought into the non-conductive state, the controller 102 shifts to the low power consumption state at time t6.

Thus, the controller 102 disables the output signal to the switch device 142 when it detects that the opposing device is in the unconnected state. Then, the controller 102 invalidates the output signal to the switch device 142, electrically disconnects the interrupt signal wiring 128, the GND wiring 132, and the GND bus 118, and then shifts to the low power consumption state.

By inserting the plug of the USB cable 2 into the receptacle 180 of the device by the control operation as described above, the controller 102 can be returned from the low power consumption state to the active state, and can also be shifted to the low power consumption state depending on the situation.

(4. Example of Wiring Configuration)

Next, an example of wiring configuration in the receptacle 180 will be described.

Figure 8:
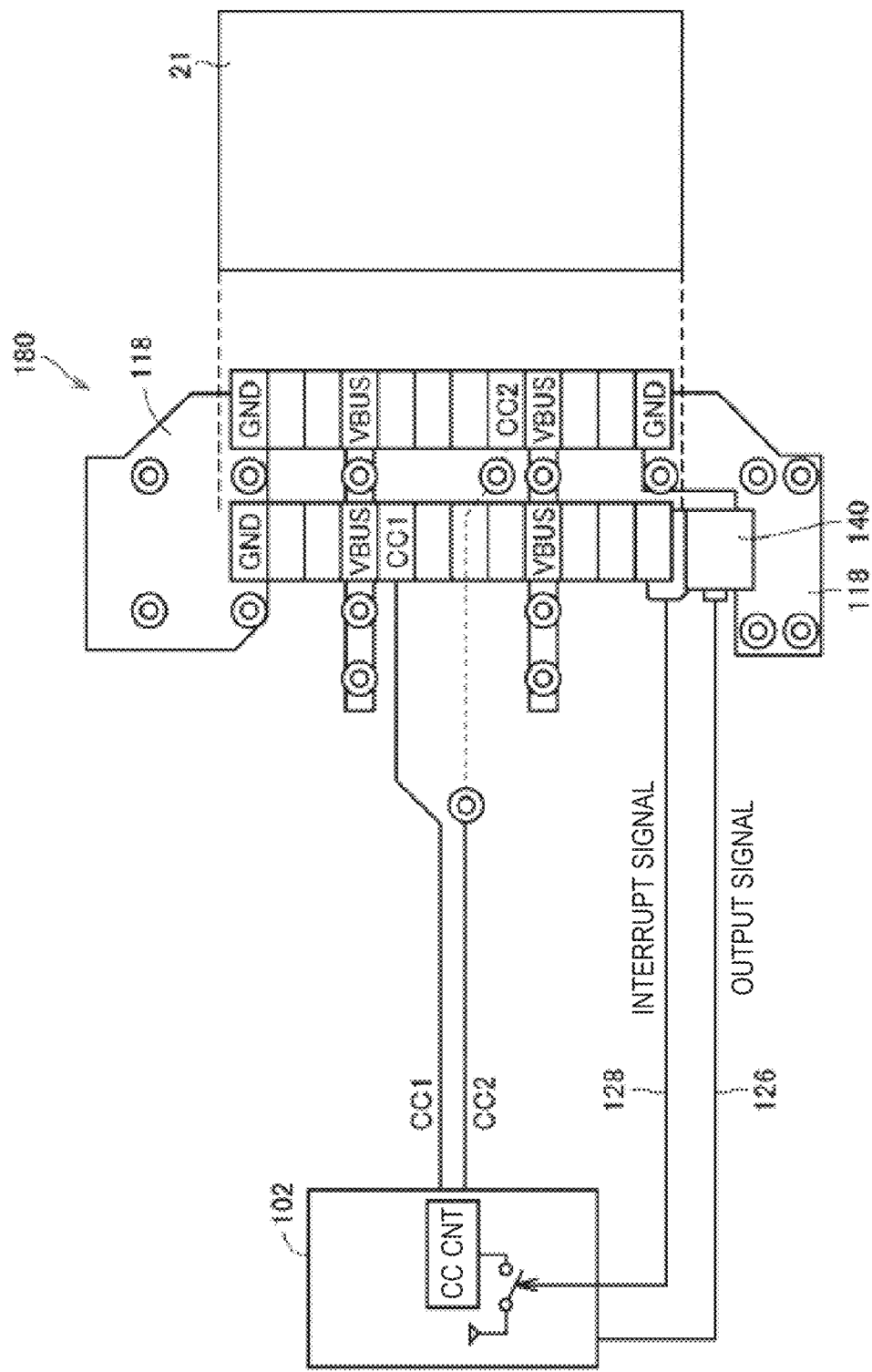
FIG. 8 is a schematic diagram showing an example of a wiring configuration of a power supply device according to the first embodiment.

FIG. 8 is a schematic diagram showing an example of the wiring configuration of the power supply device 100 according to the first embodiment. In FIG. 8, among a plurality of pins provided in the receptacle 180, a pin aligned on the upper side and a pin aligned on the lower side are illustrated side by side.

Referring to FIG. 8, a metal GND pattern corresponding to the GND bus 118 is provided at both ends of the receptacle 180 of the power supply device 100. Three of the four pins (GND pins) connected to the GND line 25 are electrically connected to the GND pattern (GND bus 118) via a via or the like. The remaining one GND pin is electrically connected to the GND pattern (GND bus 118) via the switching circuit 140.

As described above, the switching circuit 140 generates the interrupt signal of the ground potential by inserting the plug 21 of the USB cable 2 into the receptacle 180. Further, in response to the control signal from the controller 102, electrical connection/disconnection between one GND pin connected to the GND line 25 and the GND pattern (GND bus 118) is controlled.

As described above, in the first embodiment, one of the GND pins among the arranged in the receptacle according to the USB Type-C standard is connected to the input of the interrupt signal of the controller 102. The one GND pin is electrically connected to the system GND bus 118 via the switching circuit 140. An output signal of the switching circuit 140 is electrically connected to the output terminal of the controller 102. When the plug 21 of the USB cable 2 is not inserted into the receptacle 180, the switching circuit 140 disconnects the electrical connection between the one GND pin and the GND bus 118 of the system.

The four VBUS pins connected to the VBUS lines 24 are electrically connected to metallic VBUS patterns (not shown) corresponding to the power wirings 110. In addition, two pins (CC1/CC2) connected to the communication line 26 are electrically connected to the controller 102.

Figure 9:
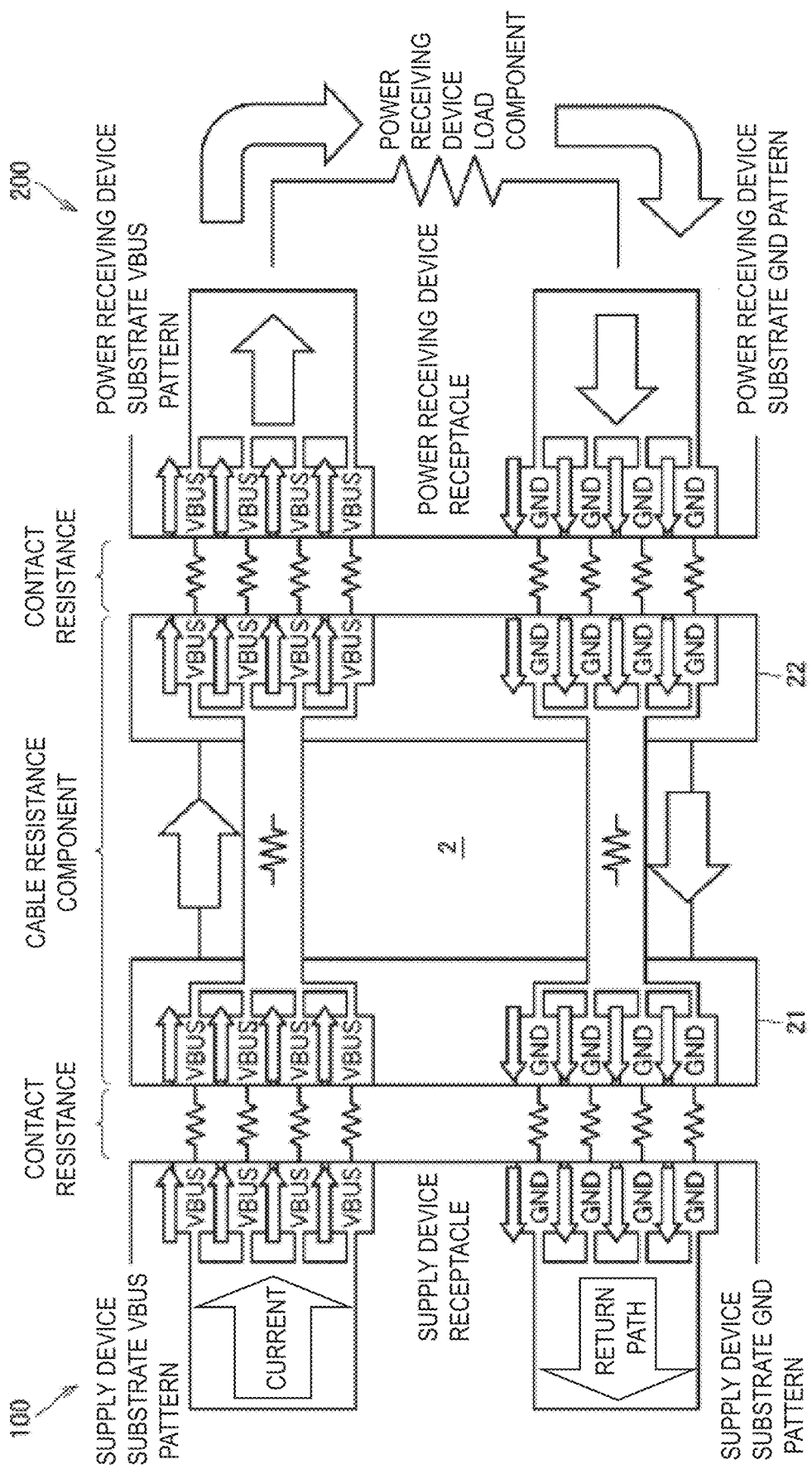
FIG. 9 is schematic diagram showing a current path using a receptacle and a plug in accordance with the USB Type-C Standard.

FIG. 9 is a schematic diagram showing a current path using receptacles and plugs according to the USB Type-C standard. Referring to FIG. 9, according to the USB Type-C standard, the current flowing through the VBUS line 24 is distributed to the four VBUS pins located in the receptacle and plug, and similarly, the current flowing through the GND line 25 is distributed to the four GND pins located in the receptacle and plug.

Figure 10:
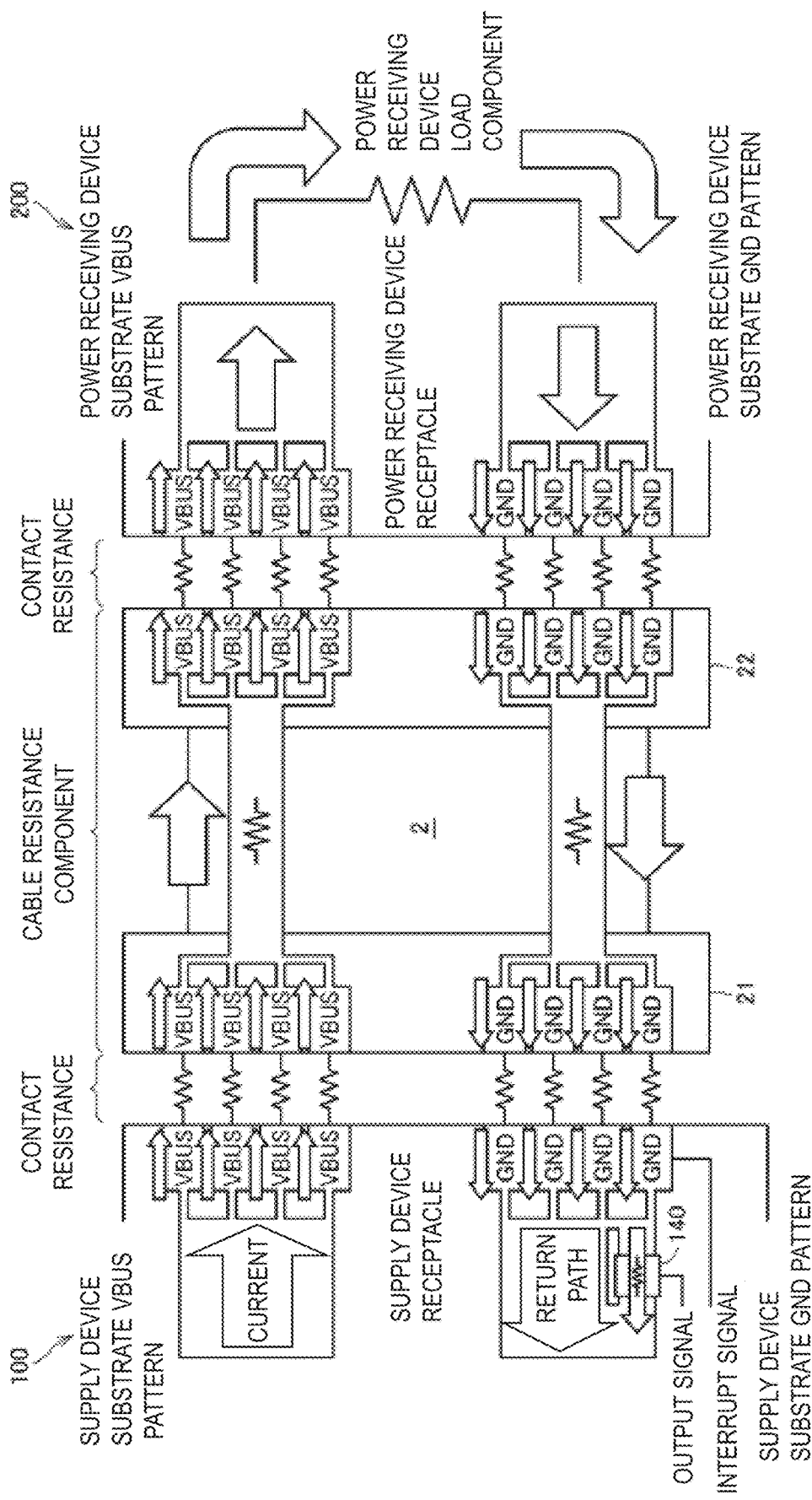
FIG. 10 is a schematic diagram showing a current path in a system according to the first embodiment.

FIG. 10 is a schematic diagram showing a current path in the system according to the first embodiment. Referring to FIG. 10, in the power supply device 100 according to the first embodiment, one of four GND pins is used as the interrupt signal.

If the switching circuit 140 does not exist and one GND pin used as the interrupt signal cannot be electrically connected to the GND bus 118, the return path must be formed by three GND pins. In this case, the amount of current flowing through each GND pin increases, and the combined contact resistance between the receptacle and the plug also increases.

In the USB Type-C standard, the largest current supplied via the VBUS line 24 and the ground line 25 is defined as 5A. Since four VBUS pins and four GND pins are arranged, the maximum load current of one pin is assumed to be 1.25 A. Even in actual product specifications, the rated current of each pin is often designed to be 1.25 A.

Here, if one GND pin is used only for generating the interrupt signal, the current per one GND pin is 1.67 A when the 5A of the largest current is supplied. That is, a current exceeding the rated current can flow. Therefore, if the current flowing through each GND pin is suppressed to the rated current in order to prevent the pin from being heated or damaged, the current that can be supplied is limited to 3.75 A.

On the other hand, in the power supply device 100 according to the first embodiment, since the switching circuit 140 electrically connects the GND pin used only for generating the interrupt signal to the GND bus 118 after the controller 102 returns from the low power consumption state, the current supplied from the power supply device 100 to the power supply device 200 is not limited.

(5. Detection of Connected and Unconnected States)

Next, an example of a detection process of Connected and Unconnected State will be described.

The controller 102 according to the first embodiment performs state transitions according to a state machine defined in the USB Type-C standard.

Figure 11:
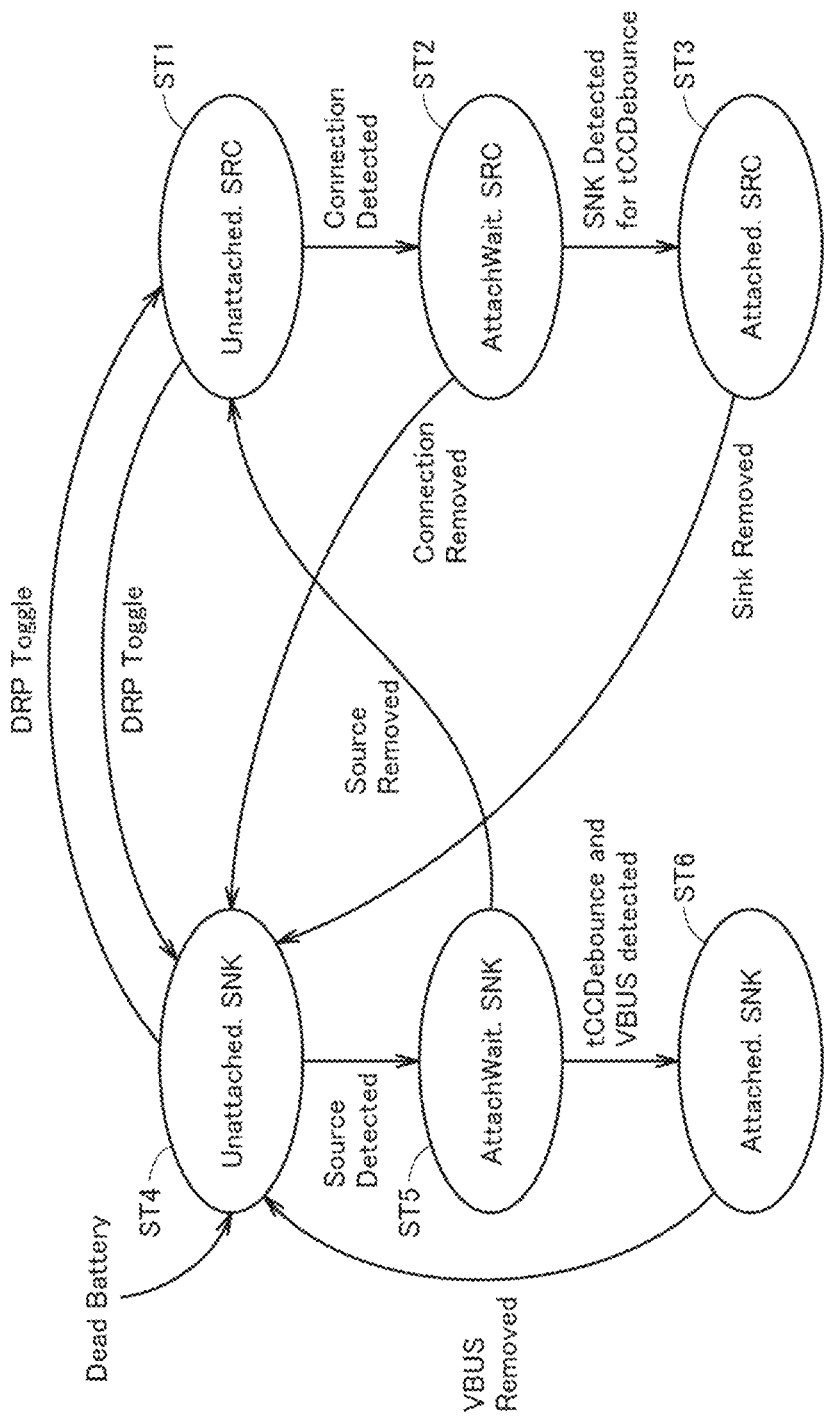
FIG. 11 is a diagram showing the main portion of a state transition diagram of a DRP (Dual Role Port) device in accordance with the USB Type-C standard.

FIG. 11 is a diagram illustrating a main portion of a state-transition diagram of a DRP (Dual Role Port) device to the USB Type-C standard. The DRP device means a device corresponding to both the Source (SRC) functioning as the power supply device and the Sink (SNK) functioning as the power receiving device 200.

Referring to FIG. 11, the DRP device alternately transitions (DRP Toggle operation) between Unattached. SRC (ST1) and Unattached. SNK (ST4) when the DRP device is not connected to any of the DRP device. Therefore, for example, if the DRP Toggle operation is executed a predetermined number of times after the transition to the Unattached. SRC (ST1) or the Unattached. SNK (ST4), but the transition is still in the Unattached. SRC (ST1) or the Unattached. SNK (ST4), it may be determined that the transition is disconnected. When determined to be in the unconnected state, the controller 102 causes the switch device 142 of the switching circuit 140 to transition to the unconnected state. This causes the interrupt input terminal of the controller 102 to be electrically disconnected from the GND bus 118 and electrically connected to one GND pin of the receptacle.

When the interrupt signal is generated by inserting the plug 21 of the USB cable 2 into the receptacle 180, the controller 102 returns to the active state and starts connection processing. Specifically, first, a DRP Toggle operation is executed. When a transition from Unattached. SRC (ST1) to AttachWait. SRC (ST2) (Connection Detected condition established) or a transition from Unattached. SNK (ST4) to AttachWait. SNK (ST5) (Source Detected condition established) occurs within a predetermined number of times, the controller 102 detects that the controller is in the connected state. That is, the controller 102 detects that the state transition from Unattached. SRC (ST1) to AttachWait. SRC (ST2) or the state transition from Unattached. SNK (ST4) to AttachWait. SNK (ST5) occurs, and that the state transition is made between the opposite devices. That is, when the device transitions from Unattached. SRC or Unattached. SNK to another state due to events other than DRP Toggle, it detects that the device is connected to the other device. When the controller 102 detects the connection state, the switch device 142 of the switching circuit 140 is switched to the conductive state.

As a result, the interrupt input terminal of the controller 102 is electrically connected to the GND bus 118, and forms the return path from the GND line 25 in the USB cable 2. After forming the return path from the GND line 25, the controller 102 eventually transitions to the active state.

It is also possible to determine that the device is disconnected when the device transitions to Unattached. SRC (ST1) or Unattached. SNK (ST4) by any events. Such optional events include a Plug detach event (Source Removed, a Sink Removed, a VBUS Removed, etc.) that occurs when the USB cable 2 is unplugged. Alternatively, it may include transitions to an Error Recovery state (not shown), events for detecting a Dead Battery state, and the like.

As described above, by adopting a method of judging whether or not the event is in the disconnected state after executing the DRP Toggle operation a predetermined number of times, it is possible to reliably detect whether or not the event is in the disconnected state regardless of the type of the event.

(6. Benefits)

According to the first embodiment, the power consumption of the controller 102 using the interrupt signal using the GND pin can be reduced and the current capacity of the GND pin can be avoided without inhibiting the control operation in accordance with the USB Type-C standard.

More specifically, the switching circuit 140 can electrically connect the GND pin used for generating the interrupt signal to the GND bus 118 in accordance with the output signal from the controller 102. Appropriate control of the output signal allows the GND pin to be electrically connected to the system GND bus 118 before the controller 102 returns from the low power state and begins powering. As a result, since the GND pin used for generating the interrupt signal also functions as the return path, it is possible to suppress the current flowing through each GND pin to within the rated current of 1.25 A. Further, since the four GND pins can be used as the return path, an increase in the combined contact resistance of the GND pins can be suppressed to about 1%.

Further, in the first embodiment, by performing control based on the transition condition of the state machine defined in the USB Type-C standard, the system operation including the switching circuit 140 can be made to conform to the USB Type-C standard.

Specifically, there is no substantial effect of using one GND pin to generate the interrupt signal since communication and power supply via the CC signal has not been initiated at the time of transition from Unattached.SRC (ST1) or Unattached.SNK (ST4) (both shown in FIG. 11) to another state due to connection processing at controller 102. On the other hand, when the controller 102 determines that the GND pin is in the disconnected state, the GND pin used for generating the interrupt signal shifts to the low power consumption state after the electrical connection with the GND bus 118 is disconnected. When the plug of the USB cable 2 is inserted into the receptacle of the device again, the interrupt signal is generated, and the controller 102 returns from the low power consumption state to the active state.

Second Embodiment

In the first embodiment described above, the GND pin used for generating the interrupt signal is electrically connected to the GND bus 118 using the switching circuit 140. On the other hand, a second embodiment exemplifies a simplified form focusing on generating the interrupt signal using the GND pin.

Figure 12:
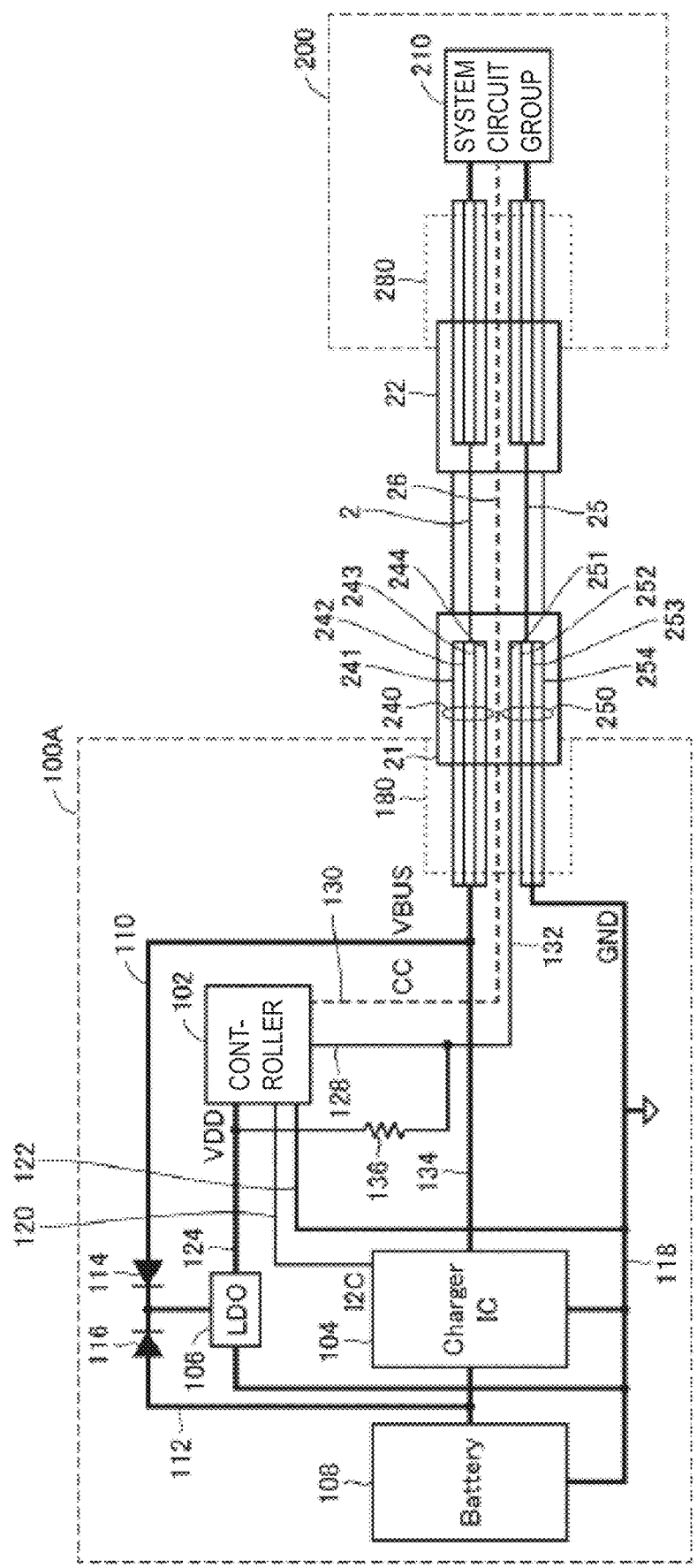
FIG. 12 is a schematic diagram illustrating a configuration example of a system according to a second embodiment.

FIG. 12 is a schematic diagram showing a configuration example of a system according to the second embodiment. Referring to FIG. 12, a power supply device 100A according to the second embodiment is different from the power supply device 100 according to the first embodiment shown in FIG. 2 in that a switching circuit 140 and the output signal wiring 126 connected to the switching circuit 140 are excluded. The remaining points are the same as those of the power supply device 100.

In the power supply device 100A, one end of the interrupt signal line 128 is electrically connectable to the GND line 25 included in the USB cable 2 via the GND line 132 and the GND branch line 251. Therefore, it is possible to generate the interrupt signal as an event that the plug 21 of the USB cable 2 is inserted into the receptacle 180. The interrupt signal enables the controller 102 to return from the low power consumption state.

As described above, the power supply device 100A according to the second embodiment can recover from the low power consumption state simply by inserting the plug of the USB cable 2 into the receptacle of the device without adding a special component or the like to the system. In particular, the power supplied will be limited compared to the case where all the pins are used for power supply, but the system as a whole will function properly if the power exchanged is relatively small.

Forms, treatments, and the like other than those described above are the same as those of the first embodiment described above, and therefore, detailed description thereof will not be repeated here.

As described above, the system according to the present embodiment has the following form.

In the present embodiment, for example, when it is determined that the controller is in the disconnected state, the controller shifts to the low power consumption state. In the low power consumption state, power consumption is stopped except for the circuit associated with the interrupt input terminal of the controller. The change in potential caused by insertion of the plug into the receptacle is used as the interrupt signal to return from the low power consumption state to the active state.

By employing such a configuration, power consumption can be suppressed to about 1/100 of that of a configuration in which connection detection is performed using a communication line without shifting to the low power consumption state.

In the present embodiment, one GND pin used for generating the interrupt signal among the plurality of GND pins arranged in the receptacle is electrically connected to the GND bus by the switching circuit when the controller returns from the low power consumption state to the active state.

By adopting such a configuration, since all the GND pins can be used as the return path after the connection processing with the opposing device is completed, power supply at the rated current can be realized.

In the present embodiment, by performing control based on the transition condition of the state machine defined in the USB Type-C standard, the system operation can be made to conform to the USB Type-C standard. More specifically, the electrical connection state of the GND pin can be managed by determining the state in which the opposite devices need to be detected, the state in which the power supply needs to be performed, the state in which the power supply needs to be received, and the like based on the condition of the state transition in accordance with the USB Type-C standard and conforming to the USB Type-C standard.

Although the invention made by the present inventor has been specifically described based on the embodiment, the present invention is not limited to the embodiment described above, and it is needless to say that various modifications can be made without departing from the gist thereof.

What is claimed is:

1. A device comprising:
  a controller configured to select an active state and a low power consumption state;
  a receptacle configured to accept a cable including a first power line, the receptacle comprising a plurality of branch lines branched from the first power line included in the cable;
  a bus electrically coupled to a part of the branch lines;
  an interrupt signal wiring configured to couple a first branch line included in a remainder part of the branch lines to an interrupt input terminal of the controller electrically; and
  a switching device configured to control electrical connection/disconnection between the interrupt signal wiring and the bus based on an output signal from the controller,
  wherein, in the low power consumption state, the controller shifts to the active state when an interrupt signal is provided with the interrupt signal wiring, and after the shifting to the active state, the controller couples the interrupt signal wiring with the bus electrically by providing the switching device with the output signal,
  wherein the interrupt signal is provided based on comparing a potential of the interrupt signal wiring with a potential of the bus.

2. The device according to claim 1, wherein the interrupt signal is provided when a result of the comparison indicates that the potential of the interrupt signal wiring matches the potential of the bus.

3. The device according to claim 2, wherein, after the shifting to the active state, the controller provides the output signal to the switching device by detecting a connection with other device via a communication line included in the cable.

4. The device according to claim 3, wherein the controller is configured to perform state transition according to a state machine defined in USB Type-C standard, and judges that the controller is in a connected state with the other device when the controller shifts from state of Unattached.SRC or Unattached.SNK to another state by events other than DRP Toggle.

5. The device according to claim 2, wherein the controller disables the output signal to the switch device when the controller detects that the other device is disconnected.

6. The device according to claim 2, wherein the controller shifts to the low power consumption state after being disable the output signal to the switch device to electrically disconnect the interrupt signal line and the bus.

7. The device according to claim 2, further comprising:
a battery; and
a charging control circuit,
wherein the cable further includes a second power line, and
wherein the charging control circuit is disposed between the battery and the second power line.

8. A control module comprising:
a device electrically coupled to other device and comprising:
  a receptacle configured to accept a cable including a first power line, and comprising a plurality of branch lines branched from the first power line included in the cable;
  a controller configured to select an active state and a low power consumption state;
  a bus electrically coupled to a part of the branch lines;
  an interrupt signal wiring configured to couple a first branch line included in a remainder part of the branch lines to an interrupt input terminal of the controller electrically; and
  a switching device configured to control electrical connection/disconnection between the interrupt signal wiring and the bus based on an output signal from the controller,
wherein, in the low power consumption state, the controller shifts to the active state when an interrupt signal is provided with the interrupt signal wiring, and after the shifting to the active state, the controller couples the interrupt signal wiring with the bus electrically by providing the switching device with the output signal, and
wherein the interrupt signal is provided when a potential of the interrupt signal wiring matches a potential of the bus.

9. The control module according to claim 8, wherein, after the shifting to the active state, the controller provides the output signal to the switching device by detecting a connection with other device via a communication line included in the cable.

10. A controller comprising:
a device electrically coupled to other device and comprising:
  a receptacle configured to accept a cable including a first power line and comprising a plurality of branch lines branched from the first power line included in the cable, a part of the branch lines being electrically coupled to a bus;
  an arithmetic processing unit;
  a state management unit configured to manage an active state and a low power consumption state;
  an interrupt detection unit configured to detect an interrupt signal provided via an interrupt signal line electrically coupled to a first branch line included in a remainder part of the plurality of branch lines, and
  a signal output unit configured to output an output signal to a switch device configured to control electrical connection/disconnection between the interrupt signal line and the bus,
wherein, in the low power consumption state, the state management unit shifts to the active state when the interrupt detection unit detects the interrupt signal,
wherein, the arithmetic processing unit outputs the output signal from the signal output unit after shifting to the active state, and
wherein the interrupt signal is provided when a potential of the interrupt signal line matches a potential of the bus.

11. The controller according to claim 10, wherein the arithmetic processing unit outputs the output signal when the arithmetic processing unit detects a connection state with the other device via a communication line included in the cable after shifting to the active state.

* * * * *